US010244459B2

(12) United States Patent
Abraham et al.

(10) Patent No.: US 10,244,459 B2
(45) Date of Patent: Mar. 26, 2019

(54) SYSTEMS AND METHODS FOR SYNCHRONIZATION WITHIN A NEIGHBOR AWARE NETWORK

(71) Applicant: QUALCOMM Incorporated, San Diego, CA (US)

(72) Inventors: Santosh Paul Abraham, San Diego, CA (US); George Cherian, San Diego, CA (US); Alireza Raissinia, Monte Sereno, CA (US); Guido Robert Frederiks, Aptos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 14/197,018

(22) Filed: Mar. 4, 2014

(65) Prior Publication Data

US 2014/0254426 A1    Sep. 11, 2014

Related U.S. Application Data

(60) Provisional application No. 61/775,298, filed on Mar. 8, 2013.

(51) Int. Cl.
  *H04W 48/10* (2009.01)
  *H04W 52/02* (2009.01)
  *H04W 84/18* (2009.01)

(52) U.S. Cl.
  CPC ....... *H04W 48/10* (2013.01); *H04W 52/0216* (2013.01); *H04W 52/0229* (2013.01);
  (Continued)

(58) Field of Classification Search
  CPC . G06F 1/32; H04Q 7/24; H04W 8/00; H04W 48/10; H04W 48/16; H04W 52/02;
  (Continued)

(56) References Cited

U.S. PATENT DOCUMENTS 7,231,530 B1 *  6/2007  Miller ............... H04W 52/0225
                                                713/320
7,406,105 B2 *  7/2008  DelMain .................. A61B 5/07
                                                128/899

(Continued)

FOREIGN PATENT DOCUMENTS

CN        100459548 C    2/2009
CN        102111867 A    6/2011
                      (Continued)

OTHER PUBLICATIONS

International Search Report and Written Opinion—PCT/US2014/020743—ISA/EPO—dated Jun. 11, 2014.
(Continued)

*Primary Examiner* — Andrew Lai
*Assistant Examiner* — Harry H Kim
(74) *Attorney, Agent, or Firm* — Knobbe, Martens, Olson & Bear, LLP

(57) ABSTRACT

Methods, apparatus, and computer readable storage mediums for enabling reduced power consumption in wireless devices operating in a neighbor aware network are disclosed. In one aspect, a method includes generating a first message, the first message indicating beacon transmit window information, the beacon transmit window information indicating a first time interval when one or more beacon messages are transmittable, and transmitting the first message on the neighbor aware network.

27 Claims, 12 Drawing Sheets

(52) U.S. Cl.
CPC ............ *H04W 84/18* (2013.01); *Y02D 70/142* (2018.01); *Y02D 70/22* (2018.01)

(58) Field of Classification Search
CPC . H04W 52/25; H04W 52/54; H04W 52/0025; H04W 74/02; H04W 52/0216; H04W 52/0229; H04W 84/18; H04J 3/06; A61B 5/07; Y02D 70/22; Y02D 70/142
See application file for complete search history.

(56) References Cited

U.S. PATENT DOCUMENTS

| | | | | |
|---|---|---|---|---|
| 8,885,530 | B2* | 11/2014 | Gong | H04W 52/54 370/311 |
| 2006/0221927 | A1 | 10/2006 | Yamada et al. | |
| 2009/0141692 | A1* | 6/2009 | Kasslin | H04W 48/16 370/338 |
| 2011/0038358 | A1 | 2/2011 | Wang et al. | |
| 2011/0150107 | A1* | 6/2011 | Jung | H04W 52/0216 375/259 |
| 2011/0255500 | A1 | 10/2011 | Cavalcanti et al. | |
| 2013/0170426 | A1 | 7/2013 | Ukita et al. | |
| 2014/0192713 | A1* | 7/2014 | Park | H04B 7/2656 370/328 |

FOREIGN PATENT DOCUMENTS

| | | |
|---|---|---|
| JP | 2006287463 A | 10/2006 |
| KR | 20110110211 A | 10/2011 |
| WO | WO-2009069018 A1 | 6/2009 |
| WO | WO-2012174151 A2 | 12/2012 |
| WO | WO-2013018303 A1 | 2/2013 |

OTHER PUBLICATIONS

European Search Report—EP17157927—Search Authority—The Hague—dated Mar. 20, 2017.

* cited by examiner

SYSTEMS AND METHODS FOR SYNCHRONIZATION WITHIN A NEIGHBOR AWARE NETWORK

CROSS-REFERENCE TO RELATED APPLICATIONS

This application claims the benefit of U.S. Provisional Application 61/775,298, filed Mar. 8, 2013, and entitled "SYSTEMS AND METHODS FOR SYNCHRONIZATION WITHIN A NEIGHBOR AWARE NETWORK," and assigned to the assignee hereof. The disclosure of this prior application is considered part of this application, and is hereby incorporated by reference in its entirety.

BACKGROUND

Field

The present application relates generally to wireless communications, and more specifically to systems, methods, and devices for synchronization in a peer-to-peer wireless network.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network may transmit and/or receive information to and from each other. To carry out various communications, the devices may need to coordinate according to a protocol. As such, devices may exchange information to coordinate their activities. Improved systems, methods, and devices for coordinating transmitting and sending communications within a wireless network are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the disclosure provides a method of enabling reduced power consumption in wireless devices operating in a neighbor aware network. The method includes generating a first message, the first message indicating beacon transmit window information, the beacon transmit window information indicating a first time interval when one or more beacon messages are transmittable, and transmitting the first message on the neighbor aware network. In some aspects, the beacon transmit window information further indicates a periodicity of a beacon transmit interval. In some aspects, the beacon transmit window information further indicates a duration of a beacon transmit window. In some aspects, a beacon message indicates a clock reference.

In some aspects, the method further includes transmitting a second message indicating discovery query window information, the discovery query window information indicating a second time interval when discovery query messages are transmittable on the neighbor aware network, each discovery query message requesting one or more services. In some of these aspects, the discovery query window information further indicates a periodicity of a discovery query interval. In some of these aspects, the discovery query window information further indicates a duration of a discovery query window. In some aspects, the discovery query window information further indicates a clock reference of a start time of a discovery query window. In some aspects, the second message is the first message.

In some aspects, the method also includes transmitting a third message indicating discovery query response window information, the discovery query response window information indicating a third time interval when discovery query response messages are transmittable on the neighbor aware network, each discovery query response message responding to one of the discovery query messages and indicating one or more services that may be provided by a node transmitting the discovery query response message. In some aspects, the discovery query response window information further indicates a periodicity of a discovery query response window. In some aspects, the discovery query response window information further indicates a duration of a discovery query response window. In some aspects, the discovery query response window information further indicates a clock reference of a start time of a discovery query response window. In some aspects, the first message is a synchronization beacon message. In some aspects, the third message is the first message.

In some aspects of the method, the first time interval is indicated in an attribute of a NAN Information Element included in the first message. In some aspects of the method the third time interval also indicates when unsolicited broadcast discovery messages may be transmitted.

Another aspect disclosed is an apparatus for enabling reduced power consumption in wireless devices operating in a neighbor aware network. The apparatus includes a processor configured to generate a first message, the first message indicating beacon transmit window information, the beacon transmit window information indicating a first time interval when one or more beacon messages are transmittable, and a transmitter configured to transmit the first message on the neighbor aware network.

In some aspects, the beacon transmit window information further indicates a periodicity of a beacon transmit interval. In some aspects, the beacon transmit window information further indicates a duration of a beacon transmit window. In some aspects, a beacon message indicates a clock reference.

In some aspects, the transmitter is further configured to transmit a second message indicating discovery query window information, the discovery query window information indicating a second time interval when discovery query messages are transmittable on the neighbor aware network, each discovery query message requesting one or more services. In some aspects, the discovery query window information further indicates a periodicity of a discovery query interval. In some aspects, the discovery query window information further indicates a duration of a discovery query window. In some aspects, the discovery query window information further indicates a clock reference of a start time of a discovery query window. In some aspects, the second message is the first message.

In some aspects, the transmitter is further configured to transmit a third message indicating discovery query response window information, the discovery query response window information indicating a third time interval when discovery query response messages are transmittable on the neighbor aware network, each discovery query response message responding to one of the discovery query messages and indicating one or more services that may be provided by a node transmitting the discovery query response message. In some aspects, the discovery query response window information further indicates a periodicity of a discovery query response window. In some aspects, the discovery query response window information further indicates a duration of a discovery query response window. In some aspects, the discovery query response window information further indicates a clock reference of a start time of a discovery query response window. In some aspects, the first message is a synchronization beacon message. In some aspects, the third message is the first message. In some aspects, the first time interval is indicated in an attribute of a NAN Information Element included in the first message. In some aspects, the third time interval also indicates when unsolicited broadcast discovery messages may be transmitted.

Another aspect disclosed is an apparatus for enabling reduced power consumption in wireless devices operating in a neighbor aware network. The apparatus includes means for generating a first message, the first message indicating beacon transmit window information, the beacon transmit window information indicating a first time interval when one or more beacon messages are transmittable, and means for transmitting the first message on the neighbor aware network. In some aspects, the beacon transmit window information further indicates a periodicity of a beacon transmit interval. In some aspects, the beacon transmit window information further indicates a duration of a beacon transmit window. In some aspects, a beacon message indicates a clock reference.

In some aspects, the apparatus also includes means for transmitting a second message indicating discovery query window information, the discovery query window information indicating a second time interval when discovery query messages are transmittable on the neighbor aware network, each discovery query message requesting one or more services. In some aspects, the discovery query window information further indicates a periodicity of a discovery query interval. In some aspects, the discovery query window information further indicates a duration of a discovery query window. In some aspects, the discovery query window information further indicates a clock reference of a start time of a discovery query window. In some aspects, the second message is the first message.

In some aspects, the apparatus also includes means for transmitting a third message indicating discovery query response window information, the discovery query response window information indicating a third time interval when discovery query response messages are transmittable on the neighbor aware network, each discovery query response message responding to one of the discovery query messages and indicating one or more services that may be provided by a node transmitting the discovery query response message. In some aspects, the discovery query response window information further indicates a periodicity of a discovery query response window. In some aspects, the discovery query response window information further indicates a duration of a discovery query response window. In some aspects, the discovery query response window information further indicates a clock reference of a start time of a discovery query response window. In some aspects, the first message is a synchronization beacon message. In some aspects, the third message is the first message. In some aspects, the first time interval is indicated in an attribute of a NAN Information Element included in the first message. In some aspects, the third time interval also indicates when unsolicited broadcast discovery messages may be transmitted.

Another aspect disclosed is a computer readable storage medium including instructions that when executed cause a processor to perform a method of enabling reduced power consumption in wireless devices operating in a neighbor aware network, the method including generating a first message, the first message indicating beacon transmit window information, the beacon transmit window information indicating a first time interval when one or more beacon messages are transmittable, and transmitting the first message on the neighbor aware network. In some aspects, the beacon transmit window information further indicates a periodicity of a beacon transmit interval. In some aspects, the beacon transmit window information further indicates a duration of a beacon transmit window. In some aspects, a beacon message indicates a clock reference.

In some aspects, the method also includes transmitting a second message indicating discovery query window information, the discovery query window information indicating a second time interval when discovery query messages are transmittable on the neighbor aware network, each discovery query message requesting one or more services. In some aspects, the discovery query window information further indicates a periodicity of a discovery query interval. In some aspects, the discovery query window information further indicates a duration of a discovery query window. In some aspects, the discovery query window information further indicates a clock reference of a start time of a discovery query window. In some aspects, the second message is the first message.

In some aspects, the method further comprising transmitting a third message indicating discovery query response window information, the discovery query response window information indicating a third time interval when discovery query response messages are transmittable on the neighbor aware network, each discovery query response message responding to one of the discovery query messages and indicating one or more services that may be provided by a node transmitting the discovery query response message. In some aspects, the discovery query response window information further indicates a periodicity of a discovery query response window. In some aspects, the discovery query response window information further indicates a duration of a discovery query response window. In some aspects, the discovery query response window information further indicates a clock reference of a start time of a discovery query response window. In some aspects, the first message is a synchronization beacon message. In some aspects, the third message is the first message. In some aspects, the first time interval is indicated in an attribute of a NAN Information Element included in the first message. In some aspects, the third time interval also indicates when unsolicited broadcast discovery messages may be transmitted.

Another aspect disclosed is a method of saving power in a wireless device when operating in a neighbor aware network. The method includes receiving a first message, the first message indicating beacon transmit window information, the beacon transmit window information including a first time interval when one or more beacon messages are transmittable on the neighbor aware network, entering a sleep state during a time period outside the first time interval, and receiving or transmitting a beacon message during the first time interval. In some aspects, entering a sleep state reduces power consumption of the wireless device.

In some aspects, the method also includes receiving a second message indicating discovery query window information, the discovery query window information including a second time interval when one or more discovery query messages are transmittable on the neighbor aware network, each discovery query message requesting one or more services, wherein the sleep state is entered during a time period outside both the first time interval and the second time interval. In some aspects, the discovery query window information includes a duration of a discovery query window. In some aspects, the discovery query window information includes a periodicity or frequency of a discovery query window. In some aspects, the method also includes determining a start time for a discovery query window based on a local clock reference and the periodicity. In some aspects, the method also includes determining a transmission time for a discovery query message based on a discovery query window start time and a random delay, and transmitting the discovery query message at the determined transmission time. In some aspects, the random delay includes a CSMA back-off delay. In some aspects, the method also includes transmitting or receiving a discovery query message during the second time interval. In some aspects, the second message is the first message.

In some aspects, the method also includes receiving a third message indicating a third time interval when discovery query response messages are transmittable on the neighbor aware network, each discovery query response message in response to a discovery query message and indicating one or more services that may be provided by a node transmitting the discovery response message. In some aspects, the method also includes transmitting or receiving a discovery query response message during the third time interval, wherein the sleep state is entered during a time period outside the first, second, and third time intervals. In some aspects, the discovery query response window information includes a duration of a discovery query response window. In some aspects, the discovery query response window information includes a periodicity of a discovery query response window. In some aspects, the method also includes determining a start time of a discovery query response window based on a local clock reference and the periodicity. In some aspects, the method also includes determining a start time of a discovery query response window based on a local clock reference and the periodicity. In some aspects, the method includes determining a transmission time for a discovery query response message based on a discovery query response window start time and a random delay; and transmitting the discovery query response message at the determined transmission time. In some aspects, the random delay includes a CSMA back-off delay. In some aspects, the third message is the first message. In some aspects, the second time interval and the third time interval overlap. In some aspects, the second time interval and the third time interval do not overlap. In some aspects, the second time interval and the third time interval are equivalent. In some aspects, the first time interval, the second time interval, and the third time interval are equivalent. In some aspects, the first time interval, the second time interval, and the third time interval do not overlap.

Another aspect disclosed is an apparatus for saving power in a wireless device when operating in a neighbor aware network. The apparatus includes a receiver configured to receive a first message, the first message indicating beacon transmit window information, the beacon transmit window information including a first time interval when one or more beacon messages are transmittable on the neighbor aware network, a processor configured to cause the wireless device to enter a sleep state during a time period outside the first time interval, and a receiver configured to receive or transmit a beacon message during the first time interval. In some aspects, entering a sleep state reduces power consumption of the wireless device.

In some aspects, the apparatus also includes a receiver configured to receive a second message indicating discovery query window information, the discovery query window information including a second time interval when one or more discovery query messages are transmittable on the neighbor aware network, each discovery query message requesting one or more services, wherein the sleep state is entered during a time period outside both the first time interval and the second time interval. In some of these aspects, the apparatus also includes a processor configured to determine a transmission time for a discovery query message based on a discovery query window start time and a random delay, and a transmitter configured to transmit the discovery query message at the determined transmission time. In some aspects, the random delay includes a CSMA back-off delay. In some aspects, the discovery query window information includes a duration of a discovery query window. In some aspects, the discovery query window information includes a periodicity or frequency of a discovery query window. In some aspects, the apparatus also includes a processor configured to determine a start time for a discovery query window based on a local clock reference and the periodicity. In some aspects, the apparatus also includes a transmitter configured to transmit or a receiver configured to receive a discovery query message during the second time interval. In some aspects, the second message is the first message.

In some aspects, the apparatus also includes a receiver configured to receive a third message indicating a third time interval when discovery query response messages are transmittable on the neighbor aware network, each discovery query response message in response to a discovery query message and indicating one or more services that may be provided by a node transmitting the discovery response message. In some aspects, the apparatus also includes a transmitter configured to transmit or a receiver configured to receive a discovery query response message during the third time interval, wherein the sleep state is entered during a time period outside the first, second, and third time intervals. In some aspects, the apparatus also includes a processor configured to determine a transmission time for a discovery query response message based on a discovery query response window start time and a random delay, and a transmitter configured to transmit the discovery query response message at the determined transmission time. In some aspects, the random delay includes a CSMA back-off delay. In some aspects, the discovery query response window information includes a duration of a discovery query response window. In some aspects, the discovery query response window information includes a periodicity of a discovery query response window. In some aspects, the apparatus also includes a processor configured to determine a start time of a discovery query response window based on a local clock reference and the periodicity. In some aspects, the third message is the first message. In some aspects, the second time interval and the third time interval overlap. In some aspects, the second time interval and the third time interval do not overlap. In some aspects, the second time interval and the third time interval are equivalent. In some aspects, the first time interval, the second time interval, and the third time interval are equivalent. In some aspects, the first time interval, the second time interval, and the third time interval do not overlap.

Another aspect disclosed is an apparatus for saving power in a wireless device when operating in a neighbor aware network. The apparatus includes means for receiving a first message, the first message indicating beacon transmit window information, the beacon transmit window information including a first time interval when one or more beacon messages are transmittable on the neighbor aware network, means for entering a sleep state during a time period outside the first time interval, and means for receiving or transmitting a beacon message during the first time interval. In some aspects, the means for entering a sleep state reduces power consumption of the wireless device when the device is in the sleep state.

In some aspects, the apparatus also includes means for receiving a second message indicating discovery query window information, the discovery query window information including a second time interval when one or more discovery query messages are transmittable on the neighbor aware network, each discovery query message requesting one or more services, wherein the sleep state is entered during a time period outside both the first time interval and the second time interval. In some aspects, the apparatus also includes means for determining a transmission time for a discovery query message based on a discovery query window start time and a random delay, and means for transmitting the discovery query message at the determined transmission time. In some aspects, the random delay includes a CSMA back-off delay.

In some aspects, the discovery query window information includes a duration of a discovery query window. In some aspects, the discovery query window information includes a periodicity or frequency of a discovery query window. In some aspects, the apparatus also includes means for determining a start time for a discovery query window based on a local clock reference and the periodicity. In some aspects the apparatus also includes means for transmitting or receiving a discovery query message during the second time interval. In some aspects, the second message is the first message.

In some aspects, the apparatus also includes means for receiving a third message indicating a third time interval when discovery query response messages are transmittable on the neighbor aware network, each discovery query response message in response to a discovery query message and indicating one or more services that may be provided by a node transmitting the discovery response message. In some aspects, the apparatus also includes means for transmitting or receiving a discovery query response message during the third time interval, wherein the sleep state is entered during a time period outside the first, second, and third time intervals.

In some aspects, the apparatus also includes means for determining a transmission time for a discovery query response message based on a discovery query response window start time and a random delay, and means for transmitting the discovery query response message at the determined transmission time. In some aspects, the random delay includes a CSMA back-off delay. In some aspects, the discovery query response window information includes a duration of a discovery query response window. In some aspects, the discovery query response window information includes a periodicity of a discovery query response window. In some aspects, the apparatus also includes means for determining a start time of a discovery query response window based on a local clock reference and the periodicity. In some aspects, the third message is the first message. In some aspects, the second time interval and the third time interval overlap. In some aspects, the second time interval and the third time interval do not overlap. In some aspects, the second time interval and the third time interval are equivalent. In some aspects, the first time interval, the second time interval, and the third time interval are equivalent. In some aspects, the first time interval, the second time interval, and the third time interval do not overlap.

Another aspect disclosed is a computer readable storage medium comprising instructions that when executed cause a processor to perform a method of saving power in a wireless device when operating in a neighbor aware network, the method including receiving a first message, the first message indicating beacon transmit window information, the beacon transmit window information including a first time interval when one or more beacon messages are transmittable on the neighbor aware network, entering a sleep state during a time period outside the first time interval, and receiving or transmitting a beacon message during the first time interval. In some aspects, entering a sleep state reduces power consumption of the wireless device. In some aspects, the method further comprising receiving a second message indicating discovery query window information, the discovery query window information including a second time interval when one or more discovery query messages are transmittable on the neighbor aware network, each discovery query message requesting one or more services, wherein the sleep state is entered during a time period outside both the first time interval and the second time interval. In some aspects, the discovery query window information includes a duration of a discovery query window. In some aspects, the discovery query window information includes a periodicity or frequency of a discovery query window.

In some aspects, the method also includes determining a start time for a discovery query window based on a local clock reference and the periodicity. In some aspects, the method also includes transmitting or receiving a discovery query message during the second time interval. In some aspects, the second message is the first message. In some aspects, the method also includes receiving a third message indicating a third time interval when discovery query response messages are transmittable on the neighbor aware network, each discovery query response message in response to a discovery query message and indicating one or more services that may be provided by a node transmitting the discovery response message. In some aspects, the method also includes transmitting or receiving a discovery query response message during the third time interval, wherein the sleep state is entered during a time period outside the first, second, and third time intervals. In some aspects, the discovery query response window information includes a duration of a discovery query response window. In some aspects, the discovery query response window information includes a periodicity of a discovery query response window. In some aspects, the method also includes determining a start time of a discovery query response window based on a local clock reference and the periodicity. In some aspects, the third message is the first message. In some aspects, the second time interval and the third time interval overlap. In some aspects, the second time interval and the third time interval do not overlap. In some aspects, the second time interval and the third time interval are equivalent. In some aspects, the first time interval, the second time interval, and the third time interval are equivalent. In some aspects, the first time interval, the second time interval, and the third time interval do not overlap.

DETAILED DESCRIPTION

Figure 1A:
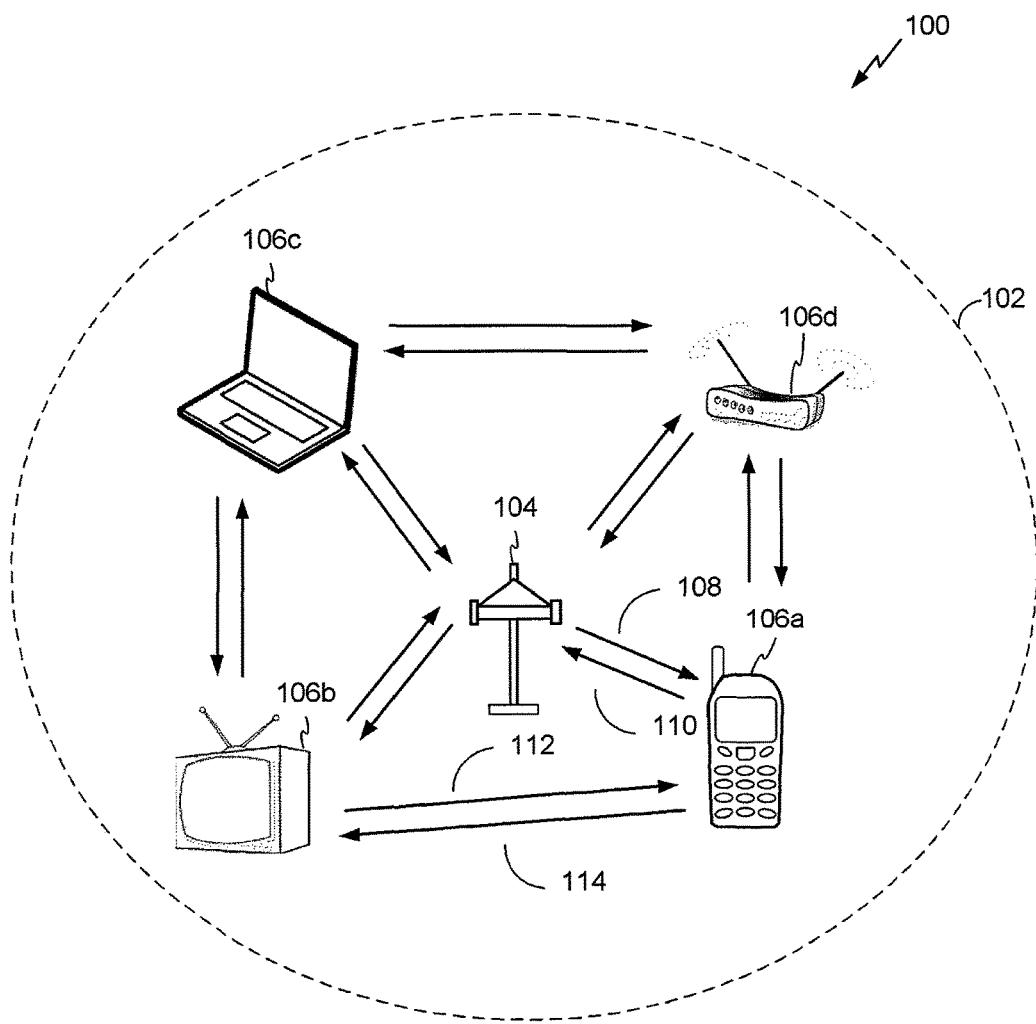
FIG. 1a illustrates an example of a wireless communication system.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. However, the various aspects described herein may apply to any communication standard, such as a wireless protocol.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, one or more nodes of a peer to peer network may transmit synchronization messages to coordinate one or more availability windows for communication between nodes of the peer to peer network. The nodes may also exchange discovery queries and responses to provide for service discovery between devices operating within the same peer to peer or neighbor aware network. A neighbor aware network may be considered a peer to peer network or an ad-hoc network in some aspects. The nodes repeatedly wake from a sleep state to periodically transmit and/or receive synchronization messages and discovery messages. It would be advantageous if the nodes 106 were able to stay longer in a sleep state to conserve power and not wake from the sleep state to transmit and/or receive synchronization messages on the network. In addition, the transmission and retransmissions of synchronization and discovery messages by the nodes 106 may introduce a large amount of unnecessary overhead to the network These synchronization and discovery messages may be transmitted on a fixed interval. For example, these synchronization and discovery messages may be transmitted once every 5, 10, 20, 50, or 100 availability windows. However, a fixed interval may be problematic as too short an interval may result in unnecessary network overheard, while too long an interval may result in synchronization error due to clock drift. Thus, it may be beneficial to optimize the intervals between synchronization messages in order to minimize synchronization errors while also minimizing unnecessary network overhead. It may also be beneficial to optimize the timing and duration of intervals used for nodes on the neighbor aware network to exchange discovery messages. This may ensure that adequate time is reserved for discovery queries and discovery query responses, so as to avoid excessive collisions which result in a need for costly retransmissions.

This disclosure provides methods, apparatus, and computer readable media that, in some aspects, generate or receive messages defining one or more of a beacon window, discovery query window, and/or discovery query response window. These messages enable the timing of one or more of these windows to be dynamically configured and controlled. For example, in some aspects, the length of one or more of the beacon, discovery query, and/or discovery query response windows may be dynamically configured based on the number of devices using a neighbor aware network, and/or the amount of network traffic or collisions on the neighbor aware network or within one or more of the windows. By dynamically configuring the timing and/or length of one or more of these windows, network latency may be reduced and/or network throughput may be improved. Additionally, in some aspects, devices participating in the neighbor aware network may utilize the information provided by the disclosed messages to increase the amount of time they spend in a reduced power state. For example, some devices may selectively configure one or more of a receiver, processor, and/or transmitter to operate in a reduced power state when outside one or more of the beacon, discovery query, and/or discovery query response windows. This may result in increased battery life for these devices.

FIG. 1a illustrates an example of a wireless communication system 100. The wireless communication system 100 may operate pursuant to a wireless standard, such as an 802.11 standard. The wireless communication system 100 may include an AP 104, which communicates with STAs. In some aspects, the wireless communication system 100 may include more than one AP. Additionally, the STAs may communicate with other STAs. As an example, a first STA 106a may communicate with a second STA 106b. As another example, a first STA 106a may communicate with a third STA 106c although this communication link is not illustrated in FIG. 1a.

A variety of processes and methods may be used for transmissions in the wireless communication system 100 between the AP 104 and the STAs and between an individual STA, such as the first STA 106a, and another individual STA, such as the second STA 106b. For example, signals may be sent and received in accordance with OFDM/OFDMA techniques. If this is the case, the wireless communication system 100 may be referred to as an OFDM/OFDMA system. Alternatively, signals may be sent and received between the AP 104 and the STAs and between an individual STA, such as the first STA 106a, and another individual STA, such as the second STA 106b, in accordance with CDMA techniques. If this is the case, the wireless communication system 100 may be referred to as a CDMA system.

A communication link may be established between STAs. Some possible communication links between STAs are illustrated in FIG. 1a. As an example, a communication link 112 may facilitate transmission from the first STA 106a to the second STA 106b. Another communication link 114 may facilitate transmission from the second STA 106b to the first STA 106a.

The AP 104 may act as a base station and provide wireless communication coverage in a basic service area (BSA) 102. The AP 104 along with the STAs associated with the AP 104 and that use the AP 104 for communication may be referred to as a basic service set (BSS).

It should be noted that the wireless communication system 100 may not have a central AP 104, but rather may function as a peer-to-peer network between the STAs. Accordingly, the functions of the AP 104 described herein may alternatively be performed by one or more of the STAs.

Figure 1B:
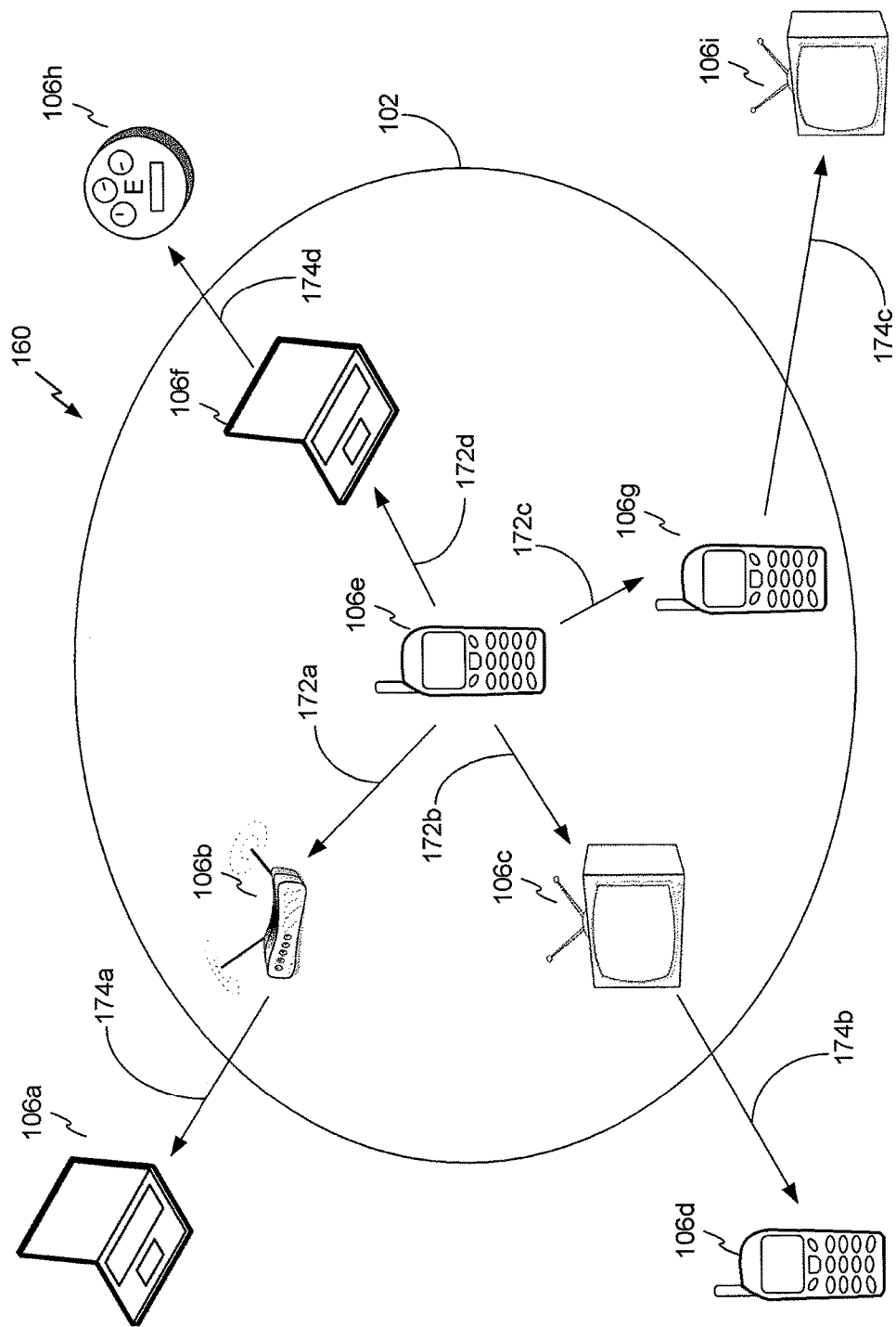
FIG. 1b illustrates another example of a wireless communication system.

FIG. 1b illustrates an example of a wireless communication system 160 that may function as a peer-to-peer network. For example, the wireless communication system 160 in FIG. 1b shows STAs 106a-106i that may communicate with each other without the presence of an AP. As such, the STAs, 106a-106i may be configured to communicate in different ways to coordinate transmission and reception of messages to prevent interference and accomplish various tasks. In one aspect, the networks shown in FIG. 1b may be configured as a "neighbor awareness networking" (NAN). In one aspect, a NAN may refer to a network for communication between STAs that are located in close proximity to each other. In some cases the STAs operating within the NAN may belong to different network structures (e.g., STAs in different homes or buildings as part of independent LANs with different external network connections).

In some aspects, a communication protocol used for communication between nodes on the peer to peer communications network 160 may schedule periods of time during which communication between network nodes may occur. These periods of time when communication occurs between STAs 106a-106i may be known as availability windows. An availability window may include a discovery interval or paging interval as discussed further below.

The protocol may also define other periods of time when no communication between nodes of the network is to occur. In some embodiments, nodes may enter one or more sleep states when the peer to peer network 160 is not in an availability window. Alternatively, in some embodiments, portions of the stations 106a-i may enter a sleep state when the peer to peer network is not in an availability window. For example, some stations may include networking hardware that enters a sleep state when the peer to peer network is not in an availability window, while other hardware included in the STA, for example, a processor, an electronic display, or the like do not enter a sleep state when the peer to peer network is not in an availability window.

The peer to peer communication network 160 may assign one node to be a root node. In FIG. 1b, the assigned root node is shown as STA 106e. In peer to peer network 160, the root node is responsible for periodically transmitting synchronization signals to other nodes in the peer to peer network. The synchronization signals transmitted by root node 160e may provide a timing reference for other nodes 106a-d and 106f-i to coordinate an availability window during which communication occurs between the nodes. For example, a synchronization message 172a-172d may be transmitted by root node 106e and received by nodes 106b-106c and 106f-106g. The synchronization message 172 may provide a timing source for the STAs 106b-c and 106f-106g. The synchronization message 172 may also provide updates to a schedule for future availability windows. The synchronization messages 172 may also function to notify STAs 106b-106c and 106f-106g that they are still present in the peer to peer network 160.

Some of the nodes in the peer to peer communication network 160 may function as branch synchronization nodes. A branch synchronization node may retransmit both availability window schedule and master clock information received from a root node. In some embodiments, synchronization messages transmitted by a root node may include availability window schedule and master clock information. In these embodiments, the synchronization messages may be retransmitted by the branch synchronization nodes. In FIG. 1b, STAs 106b-106c and 106f-106g are shown functioning as branch-synchronization nodes in the peer to peer communication network 160. STAs 106b-106c and 106f-106g receive the synchronization message 172a-172d from root node 106e and retransmit the synchronization message as retransmitted synchronization messages 174a-174d. By retransmitting the synchronization message 172 from root node 106e, the branch synchronization nodes 106b-106c and 106f-106g may extend the range and improve the robustness of the peer to peer network 160.

The retransmitted synchronization messages 174a-174d are received by nodes 106a, 106d, 106h, and 106i. These nodes may be characterized as "leaf" nodes, in that they do not retransmit the synchronization message they receive from either the root node 106e or the branch synchronization nodes 106b-106c or 106f-106g.

Synchronization messages, or synchronization frames, may be transmitted periodically. However, periodic transmission of synchronization messages may be problematic for the nodes 106. These problems may be caused by the nodes 106 having to repeatedly wake from a sleep state to periodically transmit and/or receive synchronization messages. It would be advantageous if the nodes 106 were able to stay longer in a sleep state to conserve power and not wake from the sleep state to transmit and/or receive synchronization messages on the network.

When a new wireless device enters a location with a NAN, the wireless device may scan the airwaves for discovery and synchronization information before joining the NAN. It would be advantageous if the information necessary for the STA to join the NAN was quickly accessible to the STA.

In addition, the transmission and retransmissions of synchronization and/or discovery messages by the nodes 106 within a NAN may introduce a large amount of unnecessary overhead to the network.

Figure 2:
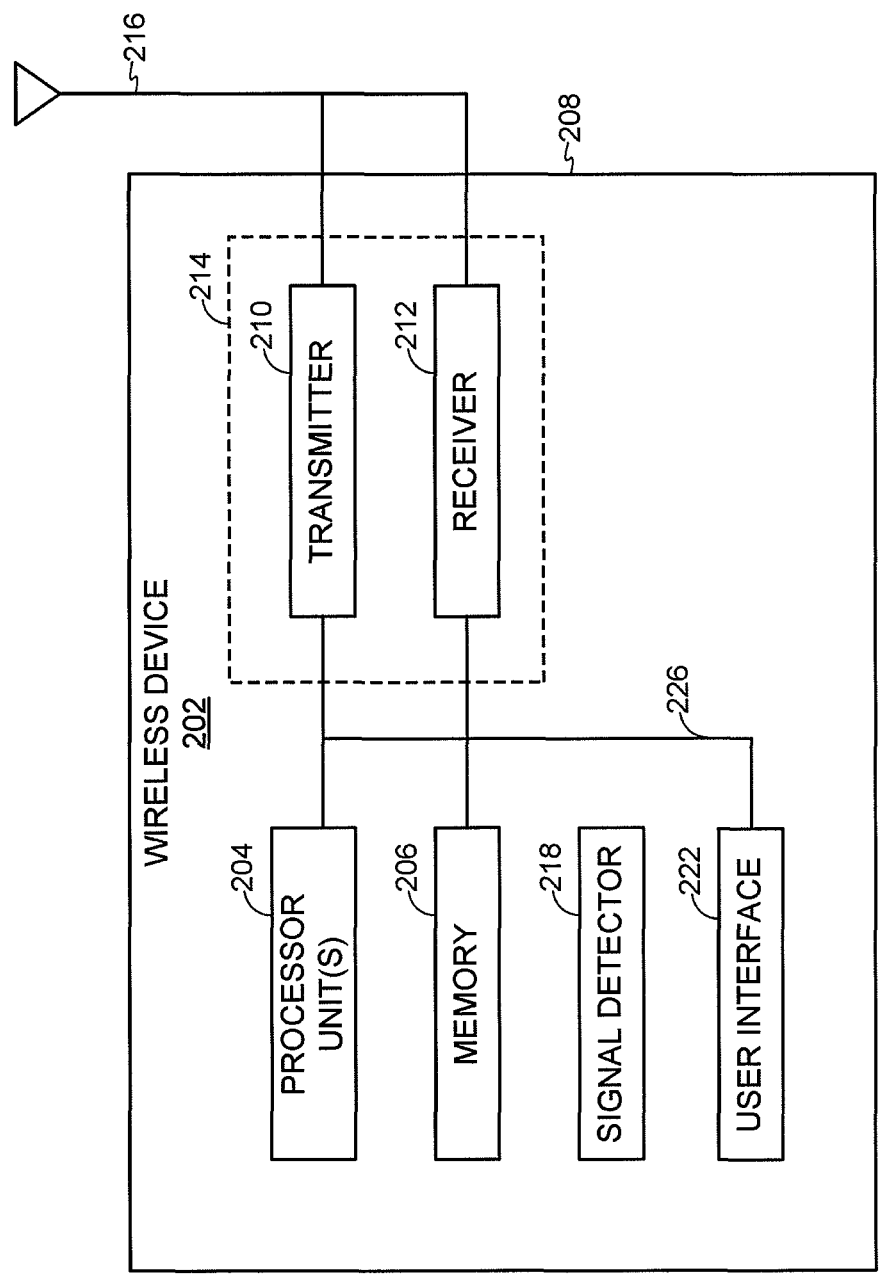
FIG. 2 illustrates a functional block diagram of a wireless device that may be employed within the wireless communication system of FIG. 1a or FIG. 1b.

FIG. 2 illustrates various components that may be utilized in a wireless device 202 that may be employed within the wireless communication system 100 or 160. The wireless device 202 is an example of a device that may be configured to implement the various methods described herein. For example, the wireless device 202 may comprise the AP 104 or one of the STAs.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different packet types or functions. For example, the transmitter 210 may be configured to transmit packets of different types generated by the processor 204. When the wireless device 202 is implemented or used as an AP 104 or STA 106, the processor 204 may be configured to process packets of a plurality of different packet types. For example, the processor 204 may be configured to determine the type of packet and to process the packet and/or fields of the packet accordingly. When the wireless device 202 is implemented or used as an AP 104, the processor 204 may also be configured to select and generate one of a plurality of packet types. For example, the processor 204 may be configured to generate a discovery packet comprising a discovery message and to determine what type of packet information to use in a particular instance.

The receiver 212 may be configured to wirelessly receive packets having different packet types. In some aspects, the receiver 212 may be configured to detect a type of a packet used and to process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. The components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Devices, such as STAs, 106a-i shown in FIG. 1b, for example, may be used for neighborhood-aware networking, or NANing. For example, various stations within the network may communicate on a device to device (e.g., peer-to-peer communications) basis with one another regarding applications that each of the stations supports. A discovery protocol may be used in a NAN to enable STAs to advertise themselves (e.g., by sending discovery packets) as well as discover services provided by other STAs (e.g., by sending paging or query packets), while ensuring secure communication and low power consumption.

In a neighborhood-aware or NAN, one device, such as STA or wireless device 202, in the network may be designated as the root device or node. In some embodiments, the root device may be an ordinary device, like the other devices in the network, rather than a specialized device such as a router. In NAN, the root node may be responsible for periodically transmitting synchronization messages, or synchronization signals or frames, to other nodes in the network. The synchronization messages transmitted by root node may provide a timing reference for other nodes to coordinate an availability window during which communication occurs between the nodes. The synchronization message may also provide updates to a schedule for future availability windows. The synchronization messages may also function to notify STAs that they are still present in the peer to peer network.

In a Neighbor Aware Network (NAN), STA's on the network may use synchronization messages transmitted by a root STA and retransmitted by branch STA's in order to determine availability windows. During these availability windows, STA's in the NAN may be configured to transmit and/or receive messages from other STA's on the network. At other times, STA's, or portions of STA's, on the NAN may be in a sleep state. For example, an STA on a NAN, such as wireless device 202, may enter a sleep state based at least in part on synchronization messages received from a root node. In some embodiments, STA's on a NAN may enter a sleep mode, where one or more elements of the STA may enter a sleep mode, rather than the entire STA. For example, STA 202 may enter a sleep mode where the transmitter 210, receiver 212, and/or transceiver 214 may enter a sleep mode based on synchronization messages received on a NAN. This sleep mode may enable the STA 202 to conserve power or battery life.

Figure 3:
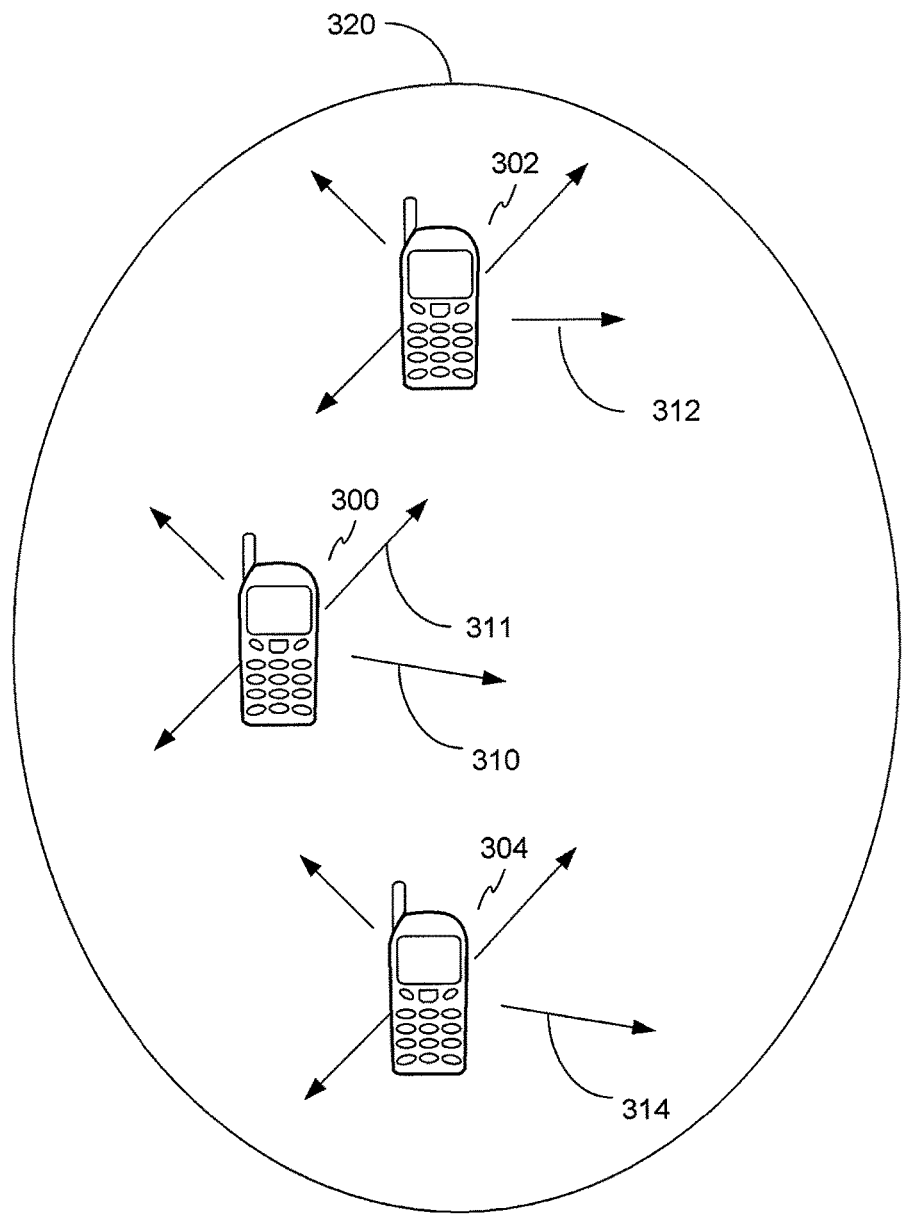
FIG. 3 illustrates an example of a communication system in which aspects of the present disclosure may be employed.

FIG. 3 illustrates an example of a NAN 320 in which aspects of the present disclosure may be employed. A root STA 300 of the network provides synchronization information to the nodes. In this way, the root STA 300 is configured to transmit and receive messages 310, 311, 312, and 314 with the STA's on the NAN 320.

STA's 300, 302, and 304 may be nodes on the NAN 320. As nodes on the NAN 320, STA's 300, 302, and 304 may transmit messages 312, and 314 to other STA's on the network 320. These messages may be transmitted to other STA's during an availability window, during which time each STA is configured to transmit and/or receive transmissions from other STA's on the network 320. For example, STA 302 may transmit messages 312 to STA 304 during an availability window for both STA's, where the availability windows is based in part upon a synchronization message received from a root STA.

Because STA's on the NAN 320 are wireless and have a finite amount of power between charges, it is advantageous if the STA's do not repeatedly wake from a sleep state to periodically transmit and/or receive synchronization messages between the STA's of the NAN 320. Thus, it would be advantageous if the STA's 300, 302, and 304 were able to stay longer in a sleep state to conserve power and not wake from the sleep state to transmit and/or receive synchronization messages on the network.

Root STA 300 may periodically transmit synchronization messages within the NAN 320. In some embodiments, synchronization messages may indicate the frequency of availability windows for STA's in the network 320, and may further indicate the frequency of synchronization messages and/or the interval until the next synchronization message. In this way, root STA 300 provides synchronization and some discovery functionality to the network 320. Since the root STA does not go to sleep, the root STA is able to coordinate discovery and timing for the NAN 320 independent of the state of the STA's 302, and 304. In this way, the STA's 302, and 304 rely on the root STA 300 for this functionality and can stay longer in the sleep state to save power.

Figure 4:
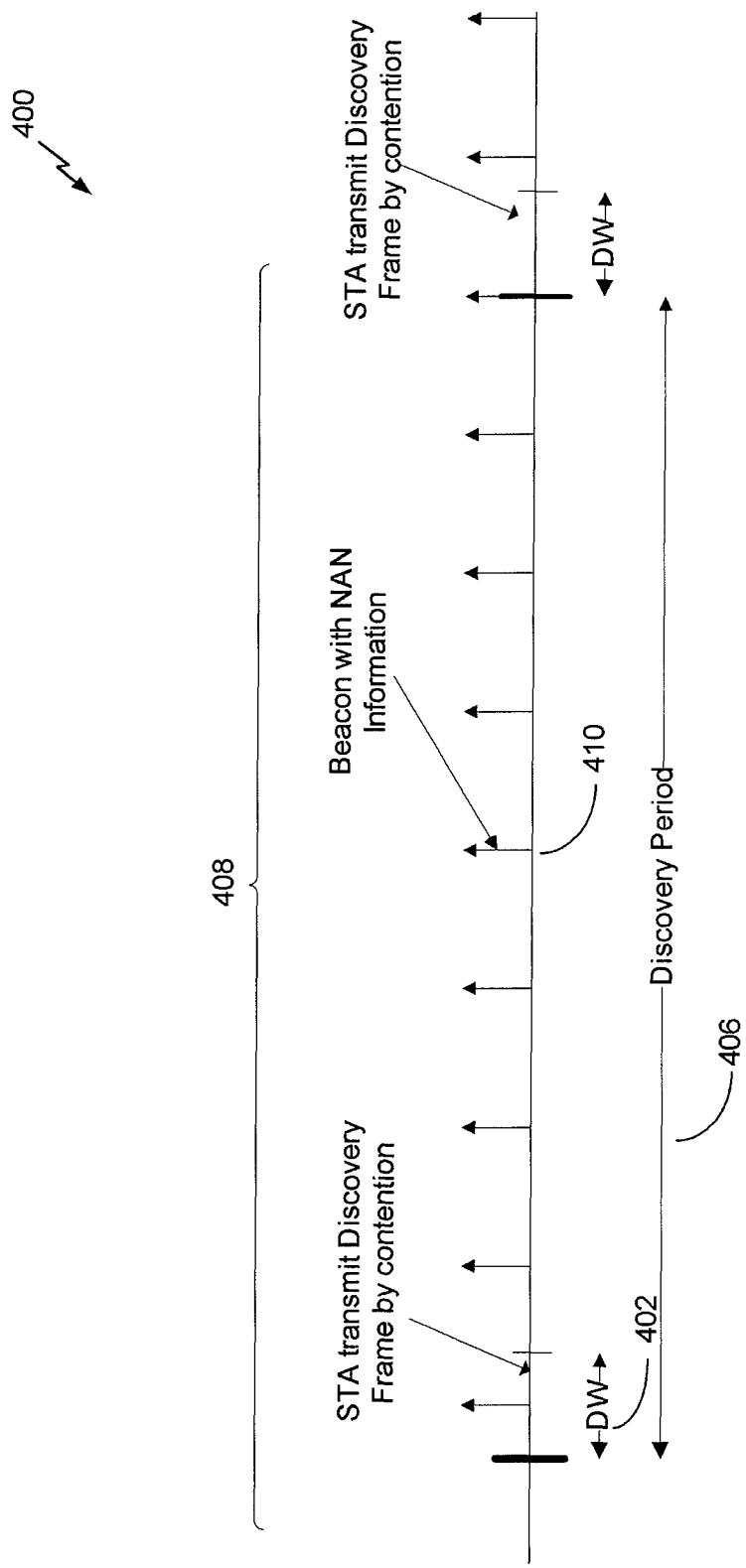
FIG. 4 illustrates an exemplary discovery window structure for an STA to communicate with an AP to discover a NAN in accordance with an exemplary implementation of the invention.

FIG. 4 illustrates an exemplary discovery window structure for an STA to discover the NAN 320 in accordance with an exemplary implementation of the invention. The exemplary discovery window structure 400 can include a discovery window (DW) 402 of time duration 404 and an overall discovery period (DP) 406 interval of time duration 408. In some aspects, communications can occur via other channels as well. Time increases horizontally across the page over the time axis.

During the DW 402, STAs can advertise services through broadcast messages such as discovery packets or discovery frames. STAs may listen to broadcast messages transmitted by other STAs. In some aspects, the duration of DWs can vary over time. In other aspects, the duration of the DW can remain fixed over a period of time. The end of the DW 402 can be separated from the beginning of the subsequent DW by a first remainder period of time as illustrated in FIG. 4.

The overall interval of duration 408 can measure the period of time from the beginning of one DW to the beginning of a subsequent DW as illustrated in FIG. 4. In some embodiments, the duration 408 can be referred to as a discovery period (DP). In some aspects, the duration of the overall interval can vary over time. In other aspects, the duration of the overall interval can remain constant over a period of time. At the conclusion of the overall interval of duration 408, another overall interval can begin, including a DW and the remainder interval. Consecutive overall intervals can follow indefinitely or continue for a fixed period of time. A STA can enter a sleep or power-save mode when the STA is not transmitting or listening or is not expecting to transmit or listen.

Discovery queries are transmitted during the DW 402. STA responses to the transmitted discovery queries are transmitted during the DP 406. As explained below, the allocated time for transmitting responses to the transmitted probe or discovery queries can, for example, overlap with the allocated time for transmitting the discovery queries, be adjacent to the allocated time for transmitting the discovery queries, or be at some time period after the end of the allocated time for transmitting the discovery queries.

The STA which sent the request for a NAN 320 subsequently wakes up to receive a beacon. The STA in the sleep mode or power-save mode can awake or return to normal operation or full power mode at the beginning of the beacon 410 to enable listening by the STA. In some aspects, the STA can awake or return to normal operation or full power mode at other times when the STA expects to communicate with another device, or as a result of receiving a notification packet instructing the STA to awake. The STA can awake early to ensure that the STA receives the beacon 410. The beacon includes an information element, described below, which at least identifies the NAN 320 which is responsive to the probe request of the STA.

The start and end of the DW 402 can be known via numerous methods to each STA desiring to transmit a probe or discovery query. In some aspects, each STA can wait for a beacon. The beacon can specify the start and end of the DW 402.

Figure 5:
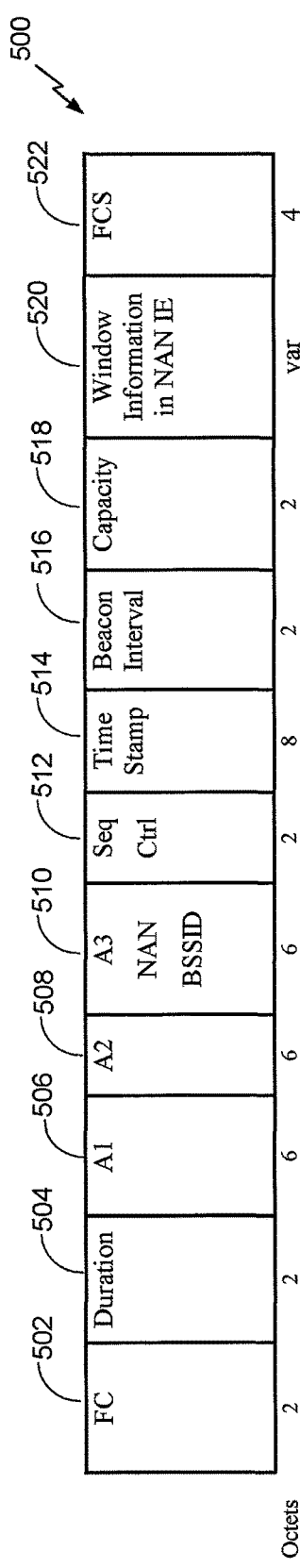
FIG. 5 shows an exemplary structure of a media access control (MAC) frame.

FIG. 5 shows an exemplary structure of a media access control (MAC) frame 500. In some aspects, the media access control frame (MAC) 500 may be utilized for the beacon signal 410 discussed above. As shown, the MAC frame 500 includes 11 different fields: a frame control (fc) field 502 a duration/identification (dur) field 504, a receiver address (a1) field 506, a transmitter address (a2) field 508, a destination address (a3) field 510, which in some aspects may indicate a NAN BSSID, a sequence control (sc) field 512, a timestamp field 514, a beacon interval field 516, a capacity field 518, an information element 520 including window information, and a frame check sequence (FCS) field 522. The fields 502-522 comprise a MAC header in some aspects. Each field may be comprised of one or more sub-fields or fields. For example, frame control field 502 of media access control header 500 may be comprised of multiple subfields, such as a protocol version, type field, subtype field, and other fields.

In some aspects, the NAN BSSID field 510 can indicate a cluster of NAN devices. In another embodiment, each NAN can have a different (for example, pseudorandom) NAN BSSID 510. In an embodiment, the NAN BSSID 510 can be based on a service application. For example, a NAN created by Application A can have a BSSID 510 based on an identifier of Application A. In some embodiments, the NAN BSSID 510 can be defined by a standards-body. In some embodiments, the NAN BSSID 510 can be based on other contextual information and/or device characteristics such as, for example, a device location, a server-assigned ID, etc. In one example, the NAN BSSID 510 can include a hash of the latitude and longitude location of the NAN. The NAN BSSID field 510 shown is six octets long. In some implementations, NAN BSSID field 510 can be four, five, or eight octets long. In some embodiments, the AP 104 can indicate the NAN BSSID 510 in an information element.

Figure 6A:
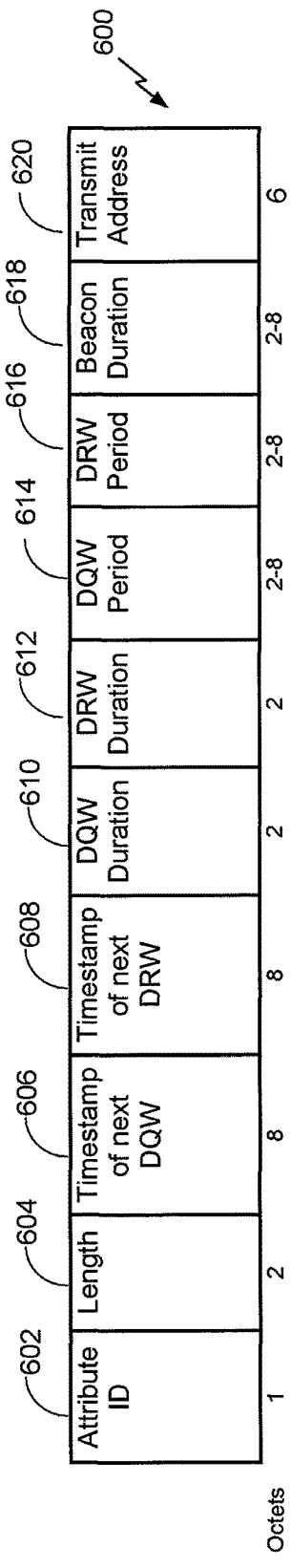
FIG. 6A shows an exemplary attribute of a NAN information element.

FIG. 6A shows an exemplary attribute of a NAN information element (IE) 600 that can be employed within the NAN 320 of FIG. 3. In various embodiments, any device described herein, or another compatible device, can transmit the attribute of the NAN IE 600 such as, for example, any of devices 300, 302, or 304 (FIG. 3). One or more messages in the wireless NAN 320 can include the attribute of the NAN IE 600 such as, for example, the beacon 410. In some aspects, the NAN information element 600 may be included in MAC header 500 field 520 as described above.

As shown in FIG. 6A, the attribute of the NAN IE 600 includes an attribute ID 602, a length field 604, a Timestamp of a next Discovery Query Window (DQW) field 606, a Timestamp of the next Discovery Query Window (DQW) field 608, a Discovery Query Window (DQW) duration field 610, a Discovery Query Response Window (DRW) duration field 612, a DQW Period field 614, a DRW Period field 616, a Beacon Window field 618, and a transmit address field 620. A person having ordinary skill in the art will appreciate that the attribute of the NAN IE 600 can include additional fields, and fields can be rearranged, removed, and/or resized.

The attribute identifier field 602 shown is one octet long. In some implementations, the attribute identifier field 602 can be two, five, or twelve octets long. In some implementations, the attribute identifier field 602 can be of variable length, such as varying length from signal to signal and/or as between service providers. The attribute identifier field 602 can include a value which identifies the element as an attribute of the NAN IE 600.

The length field 604 can be used to indicate the length of the attribute of the NAN IE 600 or the total length of subsequent fields. The length field 604 shown in FIG. 6A is two octets long. In some implementations, the length field 604 can be one, five, or twelve octets long. In some implementations, the length field 604 can be of variable length, such as varying length from signal to signal and/or as between service providers.

The Timestamp of next DQW field 606 can indicate a start time of the next discovery query window (for example, the start of the next discovery period 406 described above with respect to FIG. 4). In various embodiments, the start time can be indicated using an absolute timestamp or a relative timestamp. The Timestamp of next DQR field 608 can indicate a start time of the next discovery query response (for example, the start of the next discovery query response period described below with respect to FIGS. 7-9). In various embodiments, the start time can be indicated using an absolute timestamp or a relative timestamp.

The DQW duration field 610 can indicate a duration of the DQW (for example, the duration of the DQW described below with respect to FIG. 7-9). In various embodiments, the DQW duration field 610 can indicate the duration of the DQW in ms, µs, time units (TUs), or another unit. In some embodiments, time units can be 1024 µs. The DQW duration field 610 shown is two octets long. In some implementations, DQW duration field 610 can be four, six, or eight octets long.

The DRW duration field 612 can indicate a duration of the DRW (for example, the duration of the DRW described below with respect to FIG. 7-9). In various embodiments, the DRW duration field 612 can indicate the duration of the DRW in ms, µs, time units (TUs), or another unit. In some embodiments, time units can be 1024 µs. The DRW duration field 612 shown is two octets long. In some implementations, DRW duration field 612 can be four, six, or eight octets long.

In some embodiments, the DQW period field 614 can indicate a length of the DQW (described below with respect to FIGS. 7-9). In various embodiments, the DQW period field 614 can indicate the length of the DQW in ms, time units (TUs), or another unit. In some embodiments, time units can be 1024 µs. The DQW period field 614 shown is between two and eight octets long. In some implementations, the DQW period field 614 can be two, four, six, or eight octets long.

In some embodiments, the DRW period field 616 can indicate a length of the DRW (described below with respect to FIGS. 7-9). In various embodiments, the DRW period field 616 can indicate the length of the DRW in ms, µs, time units (TUs), or another unit. In some embodiments, time units can be 1024 µs. The DRW period field 616 shown is between two and eight octets long. In some implementations, the DRW period field 616 can be two, four, six, or eight octets long.

The Beacon Duration field 618 can indicate a duration of a Beacon Window (for example, the duration of the Beacon Window described below with respect to FIGS. 7-9). In various embodiments, the Beacon Duration field 618 can indicate the duration of the Beacon Window in ms, µs, time units (TUs), or another unit. In some embodiments, time units can be 1024 µs. The Beacon Window field 618 shown is between two and eight octets long. In some implementations, Beacon Window field 618 can be four, six, or eight octets long.

The Transmit Address field 620 indicates a network address of a node transmitting the NAN IE 600. In some aspects, the A3 field 510 of the MAC header 500 discussed above with respect to FIG. 5 will instead be set to a NAN BSSID. Therefore, in these embodiments, the NAN IE 600 provides the transmitter address field 620 to enable receivers to determine the network address of the transmitter.

Figure 6B:
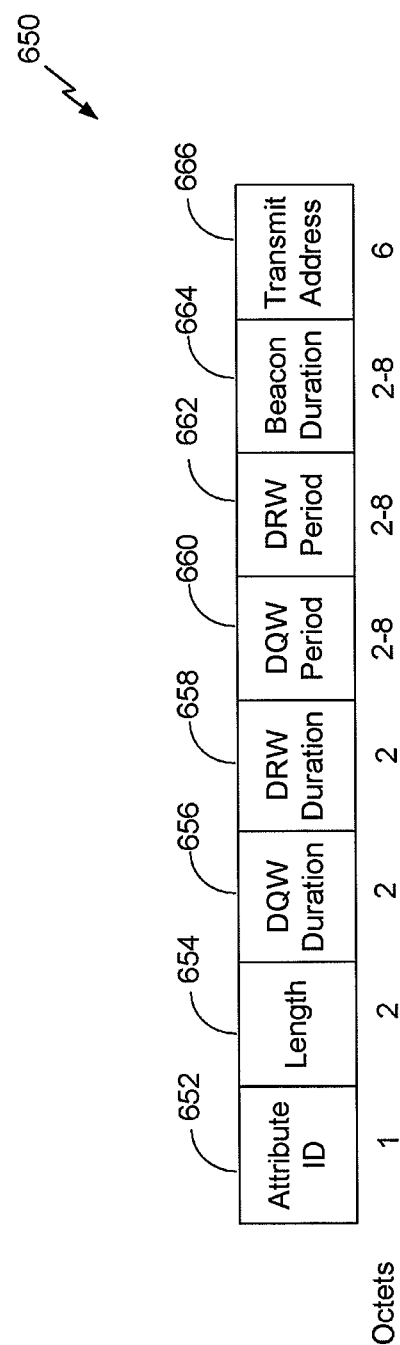
FIG. 6B shows an exemplary attribute of a NAN information element.

FIG. 6B shows an exemplary attribute of a NAN information element (1E) 650 that can be employed within the NAN 320 of FIG. 3. In various embodiments, any device described herein, or another compatible device, can transmit the attribute of the NAN IE 650 such as, for example, any of devices 300, 302, or 304 (FIG. 3). One or more messages in the wireless NAN 320 can include the attribute of the NAN IE 650 such as, for example, the beacon 410. In some aspects, the NAN information element 650 may be included in MAC header 500 field 520 as described above.

NAN information element 650 differs from NAN information element 600 in that the discovery query window timestamp and the discovery query response window timestamp have been removed from NAN information element 650 relative to NAN information element 600. In some aspects, a receiver of NAN information element 650 may determine a discovery query window start time as the time when a local clock reference that is synchronized to a NAN clock reference is evenly divided by the DQW period field 660 (Station Clock mod DQW period=0). Similarly, the discovery response window start time may be determined in some aspects based on when a local clock synchronized to a NAN clock reference is evenly divided by the DRW period field 662 (Station Clock mod DRW period=0). Note that these example methods of determining a discovery query window or discovery response window start time are similar to the method used to determine a beacon window start time, which may be found in some aspects as Station Clock mod Beacon Interval=0).

Figure 7:
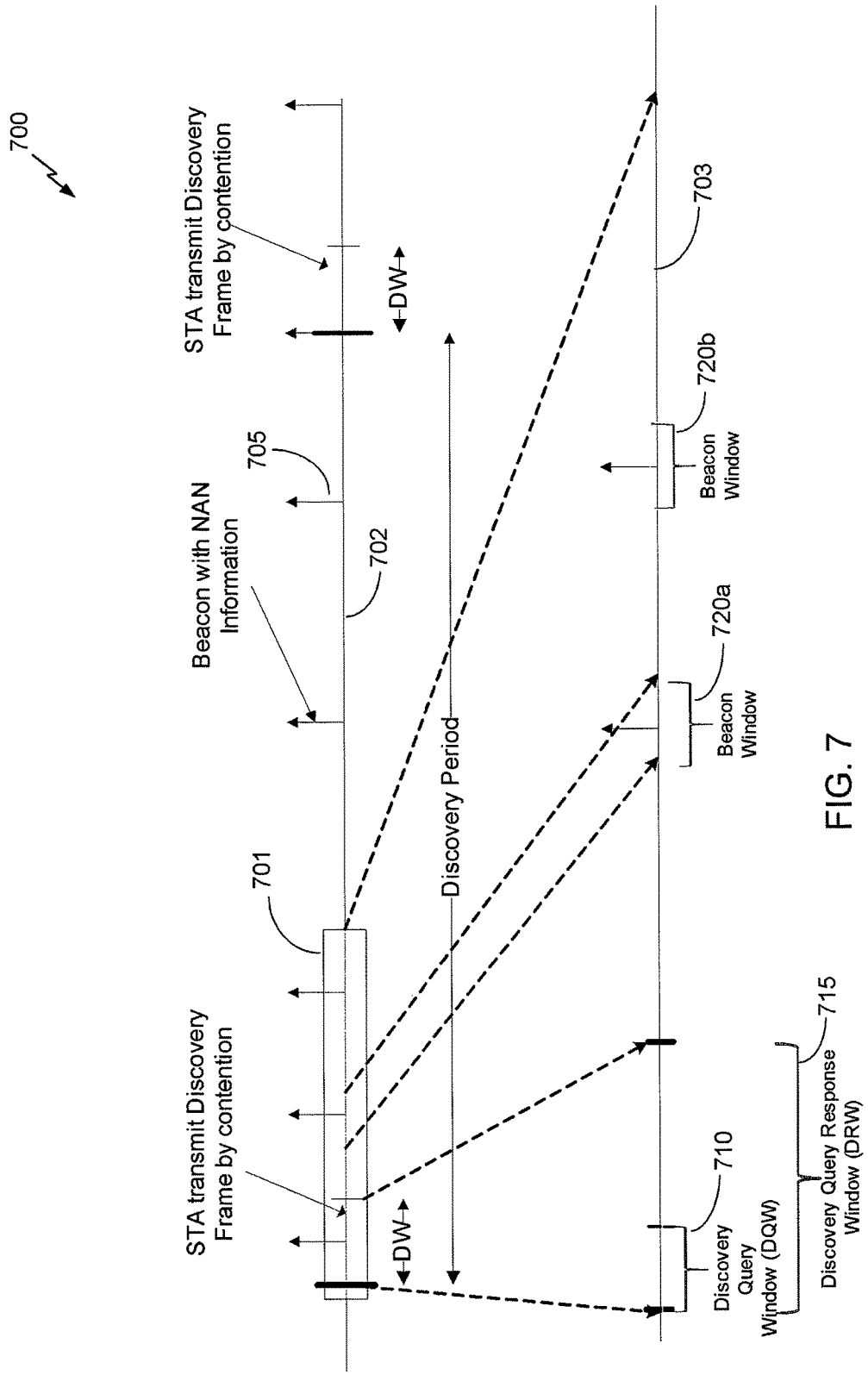
FIG. 7 is a timing diagram illustrating one embodiment of a beacon window, discovery query window, and discovery query response window.

FIG. 7 is a timing diagram 700 illustrating one embodiment of a beacon window, discovery query window, and discovery query response window within the NAN 320. A portion 701 of the timeline 702 is expanded as the lower timeline 703. Timeline 702 shows a series of beacon signals 705. Shown on the expanded timeline 703 are a discovery window 710 and a discovery query response window 715. Expanded timeline 703 also shows that one or more beacon windows 720*a-b* may occur within the discovery period. In the illustrated embodiment, the discovery query window 710 is completely within the discovery query response window 715.

Figure 8:
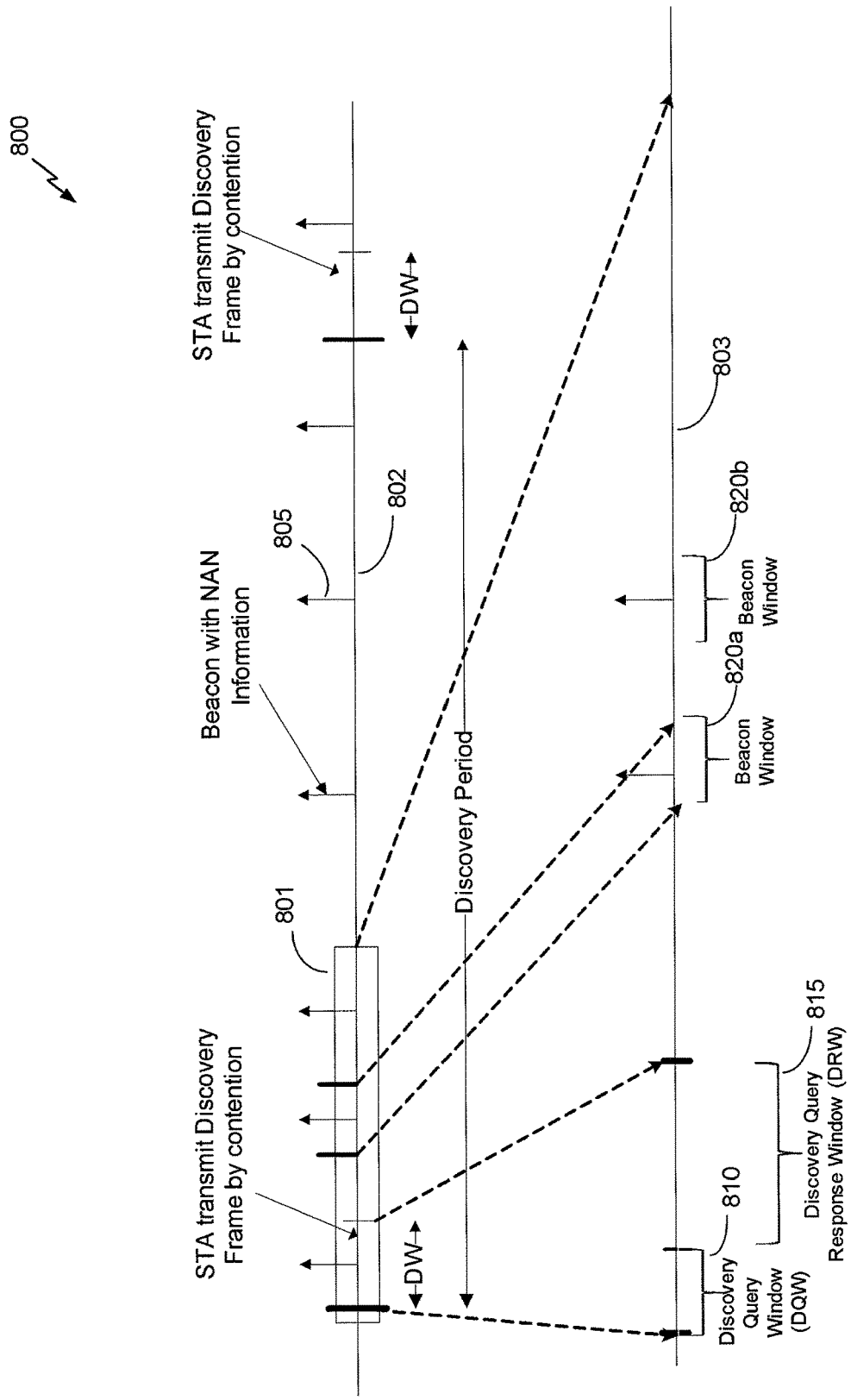
FIG. 8 is a timing diagram illustrating one embodiment of a beacon window, discovery query window, and discovery query response window.

FIG. 8 is a timing diagram 800 illustrating one embodiment of a beacon window, discovery query window, and discovery query response window within the Nan 320. A portion 801 of the timeline 802 is expanded as the lower timeline 803. Timeline 802 shows a series of beacon signals 805. Shown on the expanded timeline 803 are a discovery window 810 and a discovery query response window 815. Expanded timeline 803 also shows that one or more beacon windows 820*a-b* may occur within the discovery period. In the illustrated embodiment of FIG. 8, the discovery query window 810 does not overlap the discovery query response window 815. Instead, the discovery query response window 815 immediately follows the end of the discovery query window 810.

Figure 9:
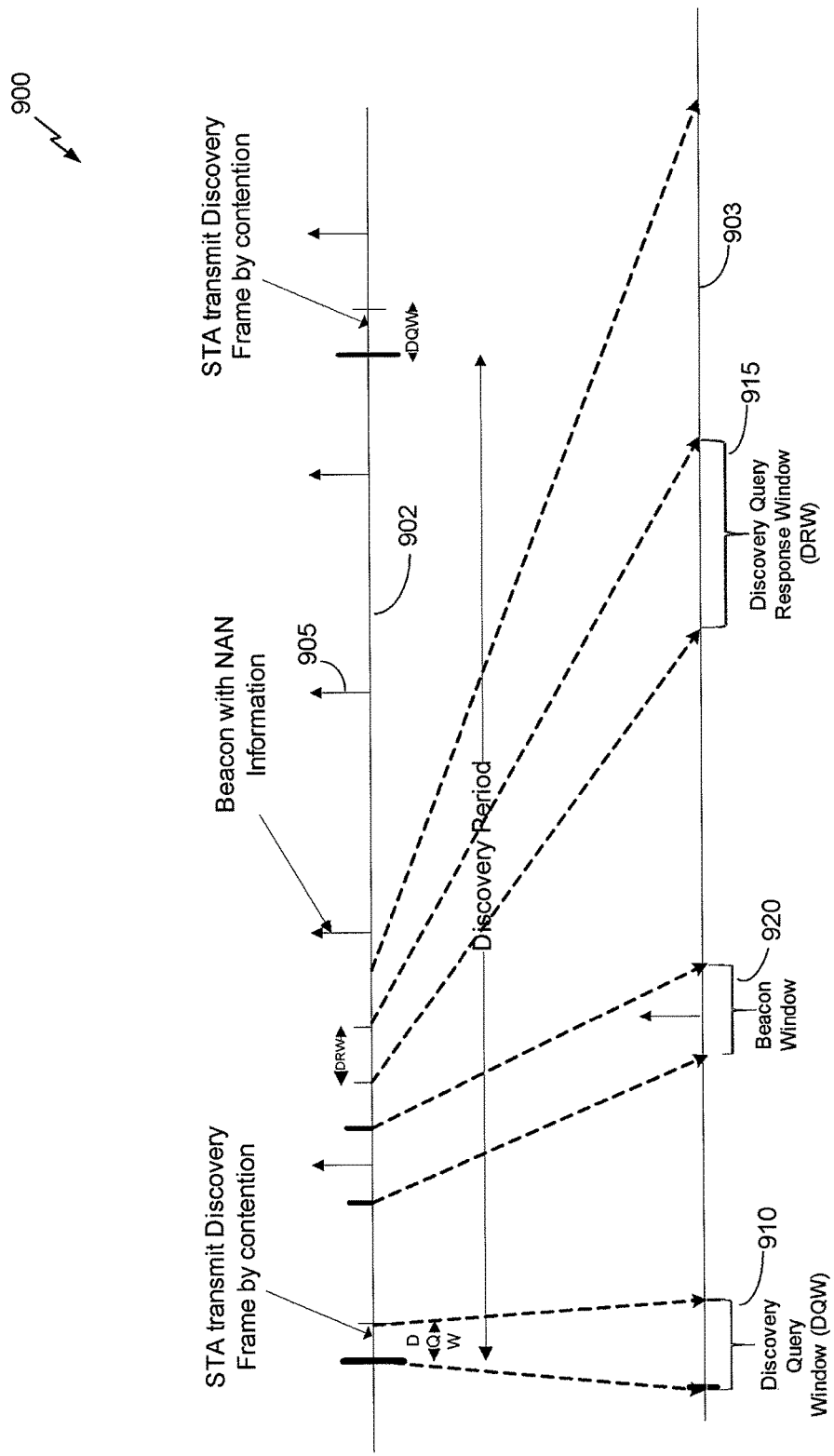
FIG. 9 is a timing diagram illustrating one embodiment of a beacon window, discovery query window, and discovery query response window.

FIG. 9 is a timing diagram 900 illustrating one embodiment of a beacon window, discovery query window, and discovery query response window within the NAN 320. A portion of timeline 902 is expanded as the lower timeline 903. Timeline 902 shows a series of beacon signals 905. Shown on the expanded timeline 903 are a discovery query window 910 and a discovery query response window 915. Expanded timeline 903 also shows that one or more beacon windows 920 may occur within the discovery period. In the illustrated embodiment of FIG. 9, the timing of the discovery query window 910 is unrelated to the timing of the discovery query response window 915.

Figure 10:
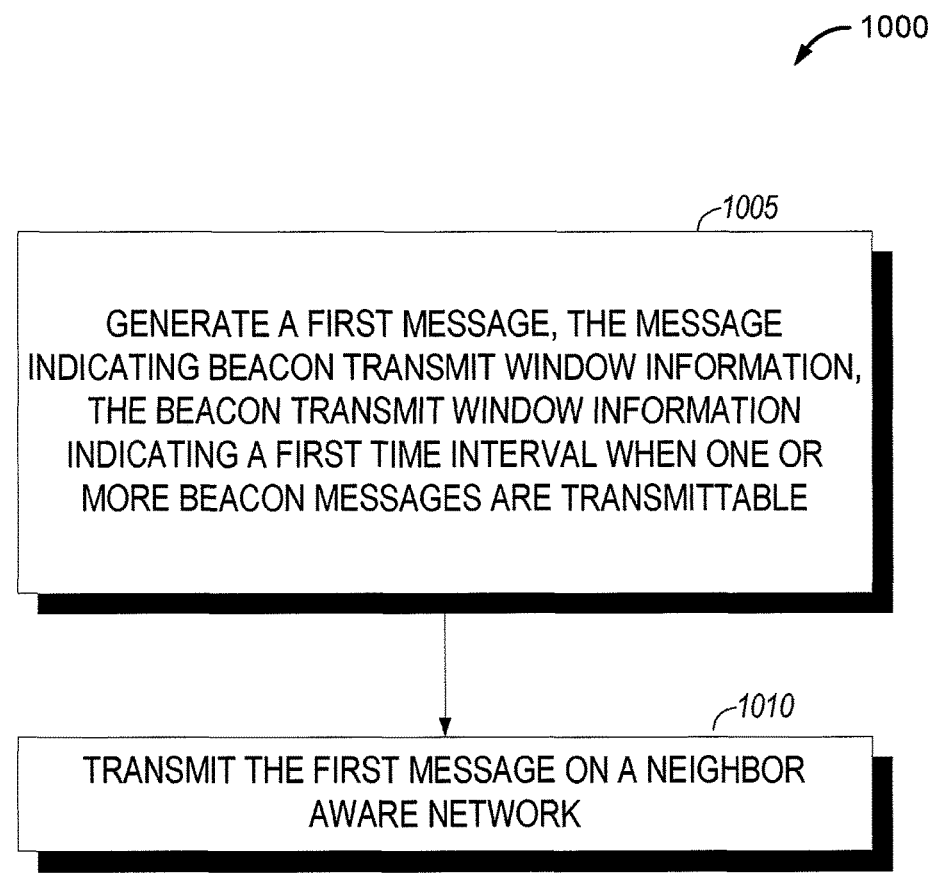
FIG. 10 is a flowchart of a method of reducing power consumption of mobile devices participating in a neighbor aware network.

FIG. 10 is a flowchart of a method of reducing power consumption of mobile devices participating in a neighbor aware network, for example, NAN 320. In some aspects, method 1000 may be performed by device 202 of FIG. 2. Method 1000 provides for a wireless message that indicates when beacon messages are transmittable. Devices intending to either send or receive (or both) beacon messages may utilize this information to determine when they may enter a lower power state of operation. For example, some devices may selectively disable and/or shutdown hardware components during periods when beacon messages are not expected, as defined by the message generated and transmitted by method 1000. This may result in reduced power consumption, reduced radiated emissions, and/or prolonged battery life in some aspects.

In some aspects, a device performing method 1000 may vary respective lengths and/or periodicities/frequencies of one or more of a beacon window, discovery query window, and/or discovery query response windows based on one or more network parameters. For example, if the neighbor aware network is experiencing a number of packet collisions during a window that is above a threshold, a device performing process 1000 may increase a duration/length and/or frequency/periodicity of the window to provide more available time for transmissions during the window. This may result in a reduced number of collisions during the window.

In some aspects, a length and/or periodicity of one window may be increased, while a duration/length and/or periodicity/frequency of a second window may be decreased. For example, if the number of collisions during a beacon transmission window is high, the length and/or periodicity of the beacon transmission window may be increased. To accommodate the increased duration and/or periodicity of the beacon transmission window, in some aspects a discovery query window duration and/or periodicity/frequency may be reduced, especially if the number of packet collisions occurring during the discovery query window is relatively low. This may indicate that the duration and/or periodicity of the discovery query window may be reduced without significant adverse effects.

In block 1005, a first message is generated. The first message indicates beacon transmit window information. The beacon transmit window information indicates a first time interval when one or more beacon messages are transmittable. In some aspects, the first time interval may be indicated by one or more of a clock reference, a beacon transmit interval duration, and/or a periodicity indication. The beacon messages may be used by the devices operating on the neighbor aware network (NAN) to discover the presence of the NAN and/or to synchronize internal clocks so as to be able to communicate during one or more time windows with other devices on the NAN. In some aspects, the generated message includes NAN IE 600 or NAN IE 650 as illustrated in FIGS. 6A-B respectively.

In some aspects, the beacon transmit window information further indicates a frequency or periodicity of a beacon transmit interval. In some aspects, the beacon transmit window information further indicates a duration of a beacon transmit window. In some aspects, a beacon message indicates a clock reference.

In some aspects, block 1005 may be performed by one or more of a programmable chip, a processor, a memory, and a network interface. For example, the block 1005 may be performed by one or more of the processor 204. In some implementations, a means for generating may include the processor 204 performing block 1005. In block 1010, the generated message is transmitted. In some aspects, block 1010 may be performed by one or more of a processor, a memory, and/or a network interface. For example, block 1104 may be performed in some aspects by the transmitter 210. In some implementations, a means for transmitting may include the transmitter 210 performing block 1104.

In some aspects, the method 1000 further includes transmitting a second message indicating discovery query window information, the discovery query window information indicating a second time interval when discovery query messages are transmittable on the neighbor aware network, each discovery query message requesting one or more services. In some aspects, the discovery query window information further indicates a frequency or periodicity of a discovery query window. In some aspects, the discovery query window information further indicates a duration of a discovery query window. In some aspects, the second message is the first message. In some aspects, the second message may include the NAN IE 600 or 650.

In some aspects, method 1000 further includes transmitting a third message indicating discovery response window information, the discovery response window information indicating discovery response window information, the discovery response window information including a third time interval when discovery response messages are transmittable on the neighbor aware network, each discovery response message responding to one of the discovery query messages and indicating one or more services that may be provided by a node transmitting the discovery response message. In some aspects, the discovery response window information further indicates a periodicity of a discovery response interval. In some aspects, the discovery response window information further indicates a duration of a discovery response interval. In some aspects, the first message is a synchronization beacon message. In some aspects, the third message may include the NAN IE 600 or 650. In some aspects, the third message is the first message.

In some aspects, the first time interval is indicated in an attribute of a NAN Information Element included in the first message. In some aspects, the third time interval also indicates when unsolicited broadcast discovery messages may be transmitted. In some aspects, the second time interval and the third time interval overlap. In some aspects, the second time interval and the third time interval do not overlap. In some aspects, the second time interval and the third time interval are equivalent. In some aspects, the first time interval, the second time interval, and the third time interval are equivalent. In some aspects, the first time interval, the second time interval, and the third time interval do not overlap.

The determination of the intervals discussed above may be based, in some aspects, on one or more network parameters. The network parameters may indicate utilization and/or capacity of one or more of a beacon window, discovery query window, and/or discovery query response window. For example, in some aspects, a device transmitting the first message may determine a length and/or periodicity of a window based on a number of devices communicating during the window, and or an amount of data traffic occurring during the window. For example, to reduce contention of a busy window, some devices generating the first message may increase the periodicity and or length of the window. To more efficiently utilize network bandwidth and/or capacity allocated to a window that is underutilized, some devices generating the first message may reduce the periodicity and/or the length of the underutilized window, and allocate the time previously allocated to the underutilized window to a second window that may be experiencing collisions and or other form of contention above a threshold, or at least a second window with higher utilization than the underutilized window.

Figure 11:
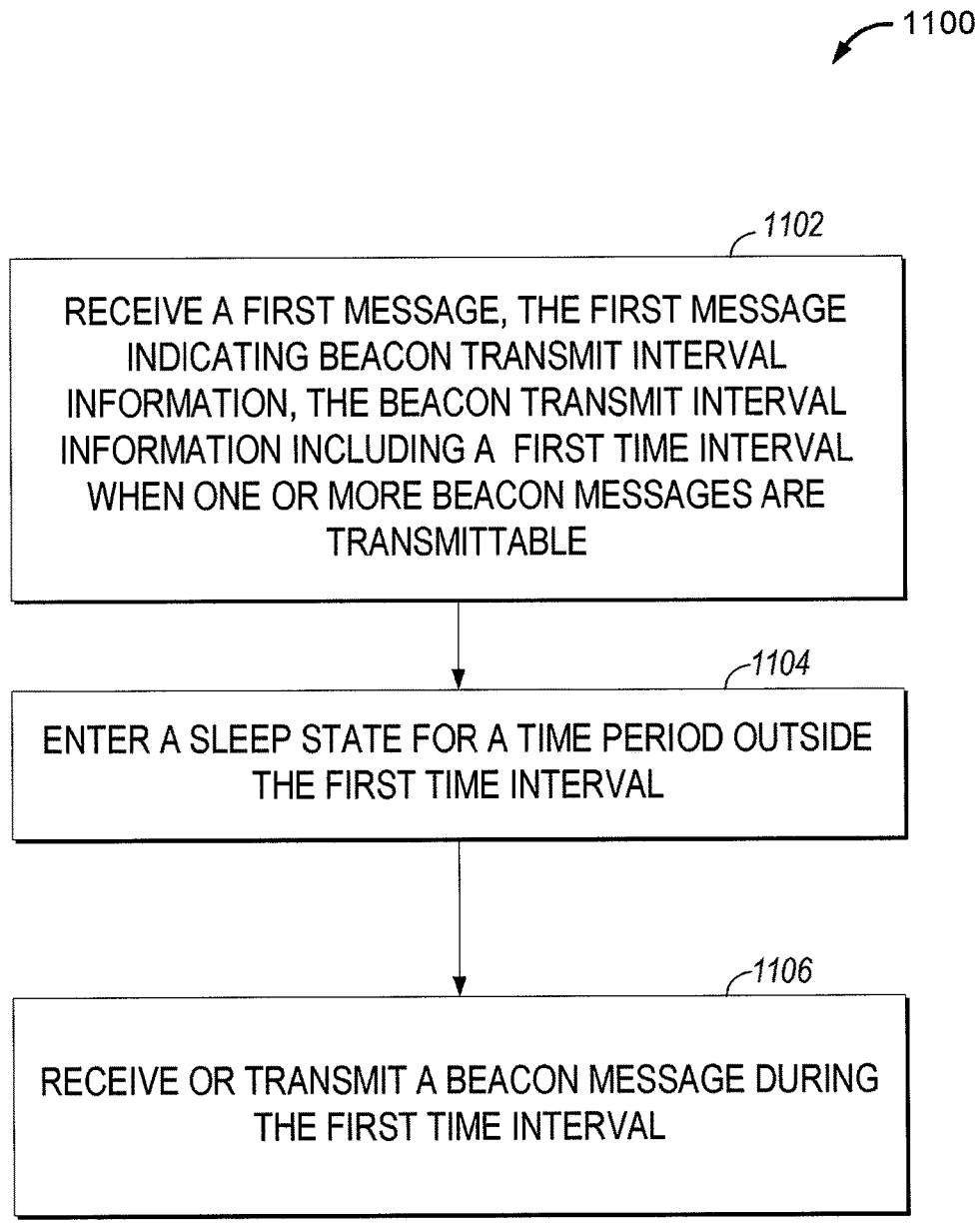
FIG. 11 is a flowchart of a method of saving power in a mobile device participating in a neighbor aware network.

FIG. 11 is a flowchart of a method of saving power in a mobile device participating in a neighbor aware network, for example, NAN 320. In some aspects, method 1100 may be performed by device 202 of FIG. 2. Because the method 1100 receives messages indicating when particular message types, such as a beacon message, discovery query message, and/or discovery query response messages may be transmitted and/or received, a device performing method 1100 may be able to enter a lower power mode, such as a sleep state, during periods when the device does not expect to receive and/or transmit any messages of one or more of those message types. In some aspects, a device performing process 1100 may selectively reduce or shut down particular hardware components, such as a receiver and/or transmitter based on the first message described below. This may result in reduced power consumption, reduced radiated emissions, and/or prolonged battery life.

In block 1102, a first message is received. The first message indicates beacon transmit window information. The beacon transmit window information indicates a first time interval when one or more beacon messages are transmittable. In some aspects, the first time interval is indicated by a clock reference, duration and/or periodicity indicator in the beacon transmit window information. In some aspects, the first message includes NAN IE 600 or NAN IE 650 as illustrated in FIGS. 6A-B respectively. Some aspects of block 1102 may be performed by one or more of a processor, a memory, and/or a network interface. For example, block 1102 may be performed in some aspects by the receiver 212. In some implementations, a means for receiving may include the receiver 212 performing block 1102.

In block 1104, the mobile device enters a sleep state for a time period outside the first time interval. In some aspects, the mobile device may be able to save power by entering a sleep state when it does not expect to receive messages from the neighbor aware network. In the aspect illustrated in FIG. 11, the first message indicates the timing for when beacon frames may be transmitted and thus received by a mobile device. In some aspects, devices that only want to receive and/or transmit beacon frames may sleep during time periods outside the first window interval.

Some aspects of block 1104 may be performed by one or more of a processor, a memory, and/or a network interface. For example, block 1104 may be performed in some aspects by the processor 204. In some implementations, a means for sleeping may include the processor 204 performing block 1104.

In block 1106, a beacon message is received or transmitted (or both) during the first time interval. Because the wireless device performing process 1100 receives or transmits a message during block 1106, the device may be in a state that enables it to actively receive or actively transmit messages on the neighbor aware network. In some aspects, the device may activate particular hardware components prior to the first time interval so those components may function during the first time interval. For example, a transmitter may be powered up prior to the first time interval so as to transmit a message during the first time interval. In some aspects, a receiver may be powered up prior to the first time interval so as to receive a message during the first time interval. The "powering up" of either a transmitter and/or a receiver prior to the first time interval may be based on the first message. Similar management of hardware components may be performed with respect to the second and/or third time intervals, discussed below.

Some aspects of block 1106 may be performed by one or more of a processor, a memory, and/or a network interface. For example, block 1106 may be performed in some aspects by the receiver 212. In some implementations, a means for receiving may include the receiver 212 performing block 1106.

Some aspects of method 1100 also include receiving a second message in block 1102 indicating a second time interval when one or more discovery query messages are transmittable on the neighbor aware network, each discovery query message requesting one or more services. In these aspects, the sleep state entered in block 1104 may be entered during a time period outside both the first time interval and the second time interval. For example, if a device performing process 1100 intends to transmit and or receive discovery query messages, the device may configure itself not to sleep during the second time interval. Alternatively, if the device has no expectation that it will transmit or (need to) receive discovery query messages, the device may configure itself to sleep during the second time interval.

In some aspects, the method 1100 further comprises transmitting or receiving a discovery query message during the second time interval in block 1106. In some aspects, the second message is the first message. In some aspects, the second message also includes an indication of a periodicity or frequency of a discovery query window. In some aspects, the second message includes an indication of a duration of a discovery query window.

In some aspects, the method 1100 further includes, in block 1106, determination of a transmission time for a discovery query message within a discovery query window based on a random number. For example, in some aspects, a transmission delay after the start of the discovery query window for a discovery query message is determined based on a random delay value. In some aspects, the transmission delay further includes a back-off value determined based on 802.11 CSMA. Use of a delay in initiating transmission of a discovery query message may reduce collisions that could otherwise occur if multiple nodes in a NAN began transmission immediately after a discovery query window opens.

In some aspects, the method 1100 also includes receiving a third message in block 1102 indicating a third time interval when discovery query response messages are transmittable on the neighbor aware network. Each discovery query response message may be transmitted by a device in response to the device receiving a discovery query message and indicates one or more services that may be provided by the device or node transmitting the discovery query response message. In some aspects, the method 1100 also includes transmitting or receiving a discovery response message during the third time interval. In some of these aspects, the sleep state is entered in block 1104 during a time period outside the first, second, and/or third time intervals. For example, if a device performing process 1100 intends to either transmit and/or receive discovery query response messages, the device may configure itself to remain "active" during the third time interval. Alternatively, if the device performing process 1100 has no expectation to transmit and/or receive discovery query response messages, the device may configure itself to "sleep" during the third time interval. As discussed previously, sleeping during the third time interval may include selectively reducing power to some hardware components during the third time interval, such as a transmitter and/or receiver.

In some aspects, the third message includes an indication of a frequency or periodicity of a discovery query response window. In some aspects, the third message includes an indication of a duration of a discovery query response window.

In some aspects, the third message is the first message. In some aspects, the second time interval and the third time interval overlap. In some aspects, the second time interval and the third time interval do not overlap. In some aspects, the second time interval and the third time interval are equivalent. In some aspects, the first time interval, the second time interval, and the third time interval are equivalent. In some aspects, the first time interval, the second time interval, and the third time interval do not overlap.

In some aspects, the method 1100 further includes, in block 1106, determination of a transmission time for a discovery query response message within a discovery query response window based on a random number. For example, in some aspects, a transmission delay after the start of the discovery query response window for a discovery query response message is determined based on a random delay value. In some aspects, the transmission delay further includes a back-off value determined based on 802.11 CSMA. Use of a delay in initiating transmission of a discovery query response message may reduce collisions that could otherwise occur if multiple nodes in a NAN initiated transmission of a discovery query response at the beginning of the discovery query response window.

It should be understood that any reference to an element herein using a designation such as "first," "second," and so forth does not generally limit the quantity or order of those elements. Rather, these designations may be used herein as a convenient wireless device of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-11 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of enabling reduced power consumption in wireless devices operating in a network, comprising:
    generating, by a wireless device, a first message, the first message including a field, the field indicating beacon transmit window information, the beacon transmit window information indicating a duration of a beacon window during which one or more beacon messages are transmittable by the wireless device or other wireless devices; and
    transmitting the first message on the network at a time prior to a start of the beacon window,
    wherein the first message further indicates one or more of discovery query window information or discovery query response window information,
    wherein the discovery query window information indicates a second duration of a discovery query window during which discovery query messages are transmittable on the network, each discovery query message requesting one or more services, and
    wherein the discovery query response window information indicates a third duration of a discovery query response window during which discovery query response messages are transmittable on the network, each discovery query response message responding to a discovery query message and indicating one or more services that are provided by a node transmitting the discovery query response message.

2. The method of claim 1, wherein the beacon transmit window information further indicates a periodicity of the beacon window.

3. The method of claim 1, further comprising:
    determining one or more network parameters;
    determining an updated duration of the beacon window based on the one or more network parameters;
    generating, by the wireless device, a second message, the second message indicating the updated duration of the beacon window; and
    transmitting the second message on the network.

4. The method of claim 1, wherein the discovery query window information further indicates a periodicity of the discovery query window and wherein the discovery query response window information further indicates a periodicity of the discovery query response window.

5. The method of claim 1, wherein the discovery query window information further indicates a clock reference of a start time of the discovery query window.

6. The method of claim 1, wherein the duration of the beacon window is indicated in an attribute of a network information element included in the first message.

7. The method of claim 1, wherein the discovery query response window also indicates when unsolicited broadcast discovery messages are transmitted.

8. The method of claim 1, further comprising
    determining one or more network parameters;
    determining an updated duration of the discovery query window based on the one or more network parameters;
    determining an updated duration of the discovery query response window based on the one or more network parameters;
    generating, by the wireless device, a second message, the second message indicating the updated durations; and
    transmitting the second message on the network.

9. The method of claim 8, wherein the one or more network parameters include one or more of synchronization error parameters, network overhead parameters, and network collision parameters.

10. The method of claim 1, wherein the first message further indicates a time interval during which beacon messages are not to be transmitted by the wireless device or other wireless devices on the network.

11. An apparatus for enabling reduced power consumption in wireless devices operating in a network, comprising:
    a processor configured to generate a first message, the first message including a field, the field indicating beacon transmit window information, the beacon transmit window information indicating a duration of a beacon window during which one or more beacon messages are transmittable by the apparatus or other apparatus on the network; and
    a transmitter configured to transmit the first message on the network at a time prior to a start of the beacon window,
    wherein the first message further indicates one or more of discovery query window information or discovery query response window information,
    wherein the discovery query window information indicates a second duration of a discovery query window during which discovery query messages are transmittable on the network, each discovery query message requesting one or more services, and
    wherein the discovery query response window information indicates a third duration of a discovery query response window during which discovery query response messages are transmittable on the network, each discovery query response message responding to one of the discovery query messages and indicating one or more services that are provided by a node transmitting the discovery query response message.

12. The apparatus of claim 11, wherein the beacon transmit window information further indicates a periodicity of the beacon window.

13. The apparatus of claim 11, wherein the duration of the beacon window is indicated in an attribute of a network information element included in the first message.

14. The apparatus of claim 11, wherein the discovery query response window also indicates when unsolicited broadcast discovery messages are transmitted.

15. The apparatus of claim 11, wherein the processor is further configured to:
determine one or more network parameters,
determining an updated duration of the beacon window based on the one or more network parameters,
generate a second message, the second message indicating the updated duration of the beacon window, and
wherein the transmitter is further configured to transmit the second message on the network.

16. The apparatus of claim 11, wherein the discovery query window information further indicates a periodicity of the discovery query window and wherein the discovery query response window information further indicates a periodicity of the discovery query response window.

17. The apparatus of claim 11, wherein the processor is further configured to:
determine one or more network parameters,
determining an updated duration of the discovery query window based on the one or more network parameters,
determining an updated duration of the discovery query response window based on the one or more network parameters,
generate a second message, the second message indicating the updated durations, and
wherein the transmitter is further configured to transmit the second message on the network.

18. The apparatus of claim 17, wherein the one or more network parameters include one or more of synchronization error parameters, network overhead parameters, and network collision parameters.

19. A method of saving power in a wireless device when operating in a network that provides communication between stations, comprising:
receiving, by a wireless device, a first message, the first message including a field, the field indicating beacon transmit window information, the beacon transmit window information including a duration of a beacon window during which one or more beacon messages are transmittable on the network by the wireless device or other wireless devices;
entering a sleep state during a time period outside the beacon window; and
receiving or transmitting a beacon message during the beacon window, the first message being received at a time prior to a start of the beacon window,
wherein the first message further indicates one or more of discovery query window information or discovery query response window information,
wherein the discovery query window information indicates a second duration of a discovery query window during which one or more discovery query messages are transmittable on the network, each discovery query message requesting one or more services,
wherein the discovery query response window information indicates a third duration of a discovery query response window during which discovery query response messages are transmittable on the network, each discovery query response message responding to a discovery query message and indicating one or more services that are provided by a node transmitting the discovery response message, and
wherein the sleep state is entered during a time period outside both the beacon window and the second duration.

20. The method of claim 19, wherein the discovery query window information includes a periodicity of the discovery query window and the discovery query response information includes a periodicity of the discovery query response window.

21. The method of claim 19, further comprising:
determining a transmission time for a discovery query message within the second duration of the discovery query window based on a random delay; and
transmitting the discovery query message at the determined transmission time.

22. The method of claim 21, wherein the random delay includes a carrier sense media access (CSMA) back-off delay.

23. The method of claim 19, wherein the second duration and the third duration overlap.

24. An apparatus for saving power in a wireless device when operating in a network, comprising:
a receiver configured to receive a message, the message including a field, the field indicating beacon transmit window information, the beacon transmit window information including a duration of a beacon window during which one or more beacon messages are transmittable on the network by the apparatus or other apparatus; and
a processor configured to cause the wireless device to enter a sleep state during a time period outside the beacon window,
wherein the receiver is further configured to receive or transmit a beacon message during the beacon window, the message being received at a time prior to a start of the beacon window,
wherein the message further indicates one or more of discovery query window information or discovery query response window information, the discovery query window information including a second duration of a discovery query window during which one or more discovery query messages are transmittable on the network, each discovery query message requesting one or more services,
wherein the discovery query response window information indicates a third duration of a discovery query response window during which one or more discovery query response window messages are transmittable on the network, each discovery query response message responding to a discovery query message and indicating one or more services that are provided by a node transmitting the discovery query response message, and
wherein the processor is further configured to cause the wireless device to enter the sleep state during a time period outside both the beacon window and the second duration of the discovery query window.

25. The apparatus of claim 24, further comprising:
a processor configured to determine a transmission time for a discovery query message within the second duration of the discovery query window based on a random delay; and
a transmitter configured to transmit the discovery query message at the determined transmission time.

26. The apparatus of claim 25, wherein the random delay includes a carrier sense media access (CSMA) back-off delay.

27. The apparatus of claim 24, wherein the discovery query window information includes a periodicity of the discovery query window and the discovery query response window information includes a periodicity of the discovery query response window.

* * * * *